May 11, 1926.
F. W. WENTWORTH
GARAGE
Filed April 21, 1923 4 Sheets-Sheet 2
1,584,705
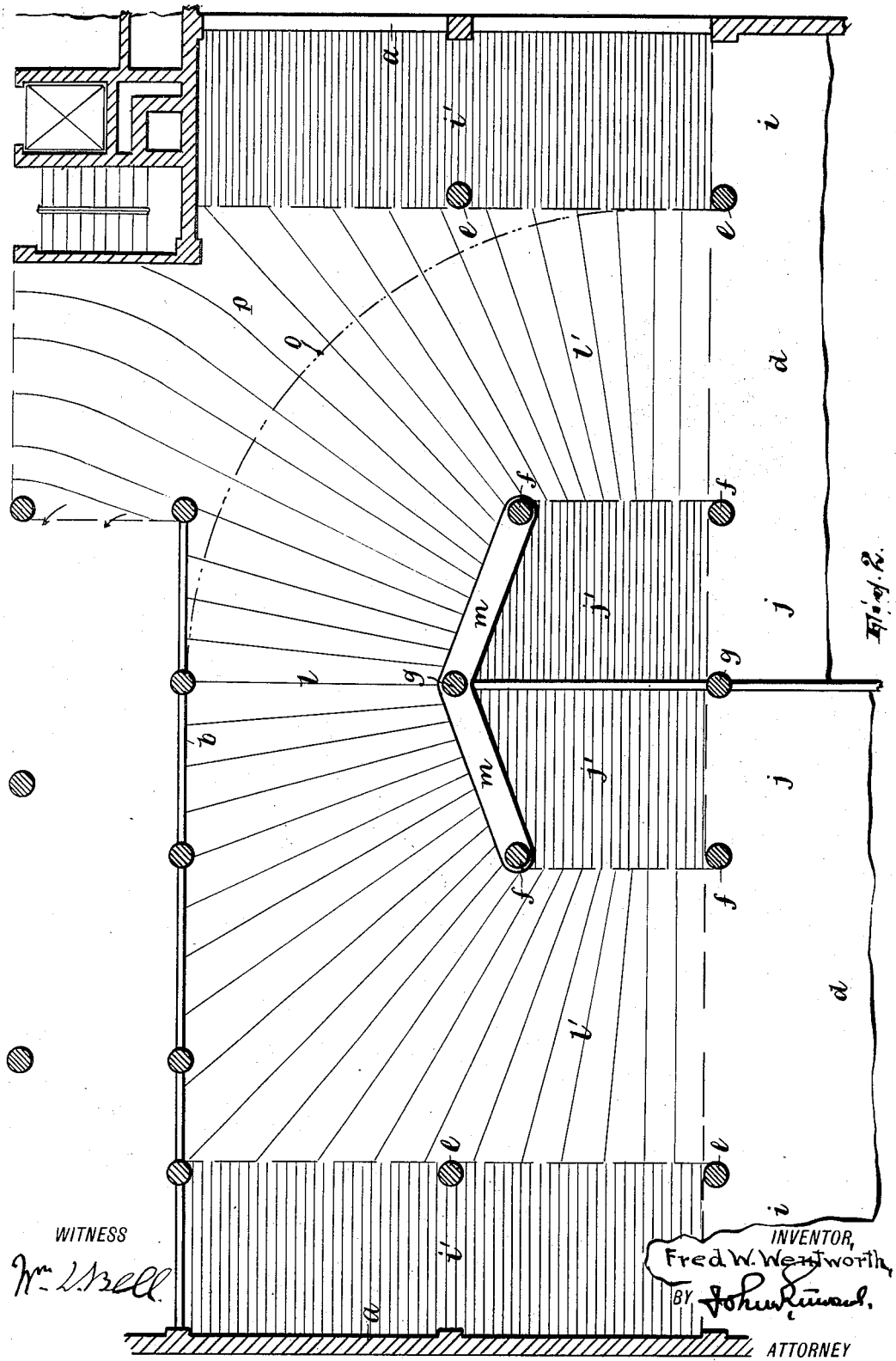
WITNESS
INVENTOR,
Fred W. Wentworth
BY
ATTORNEY

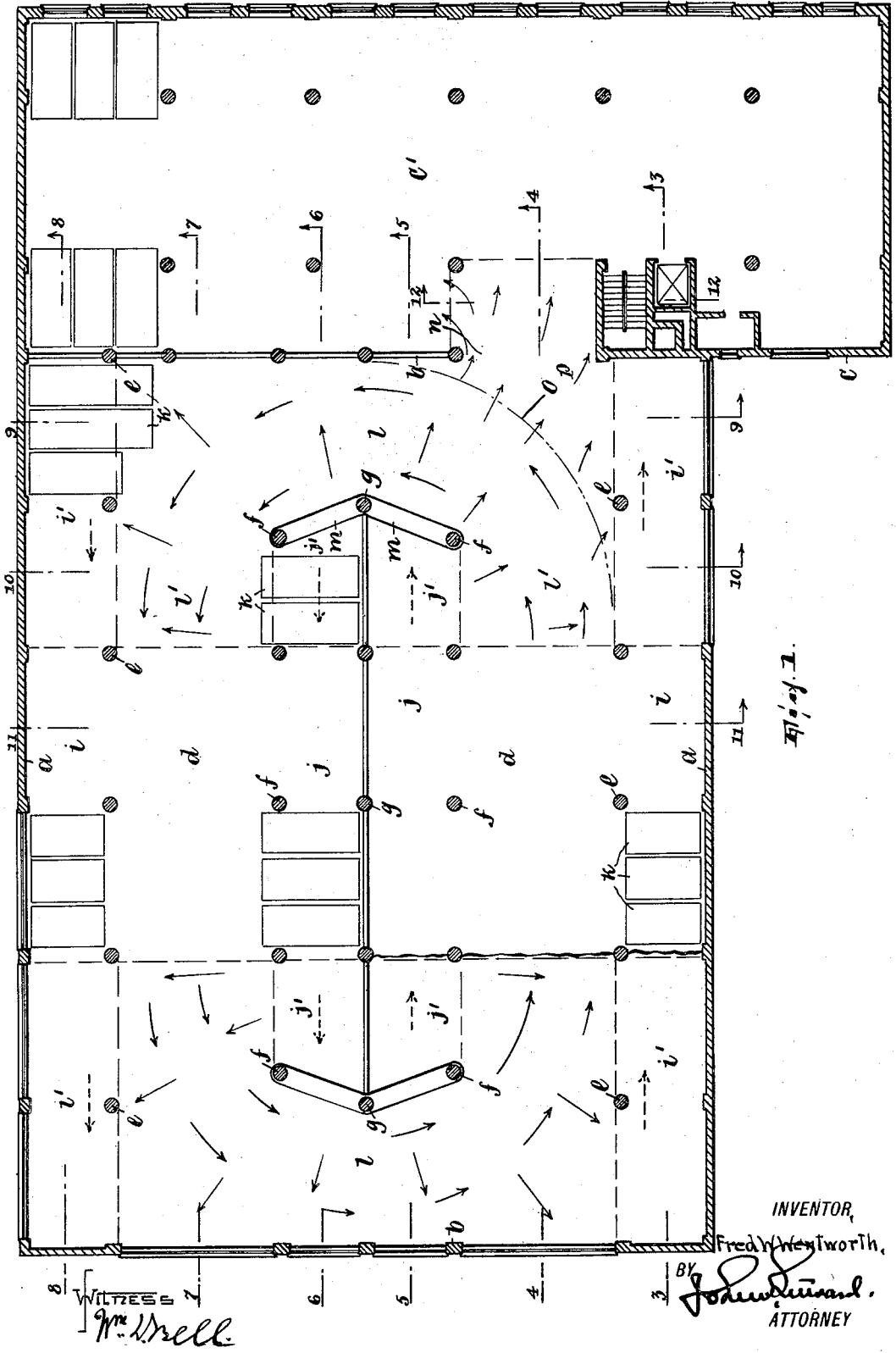

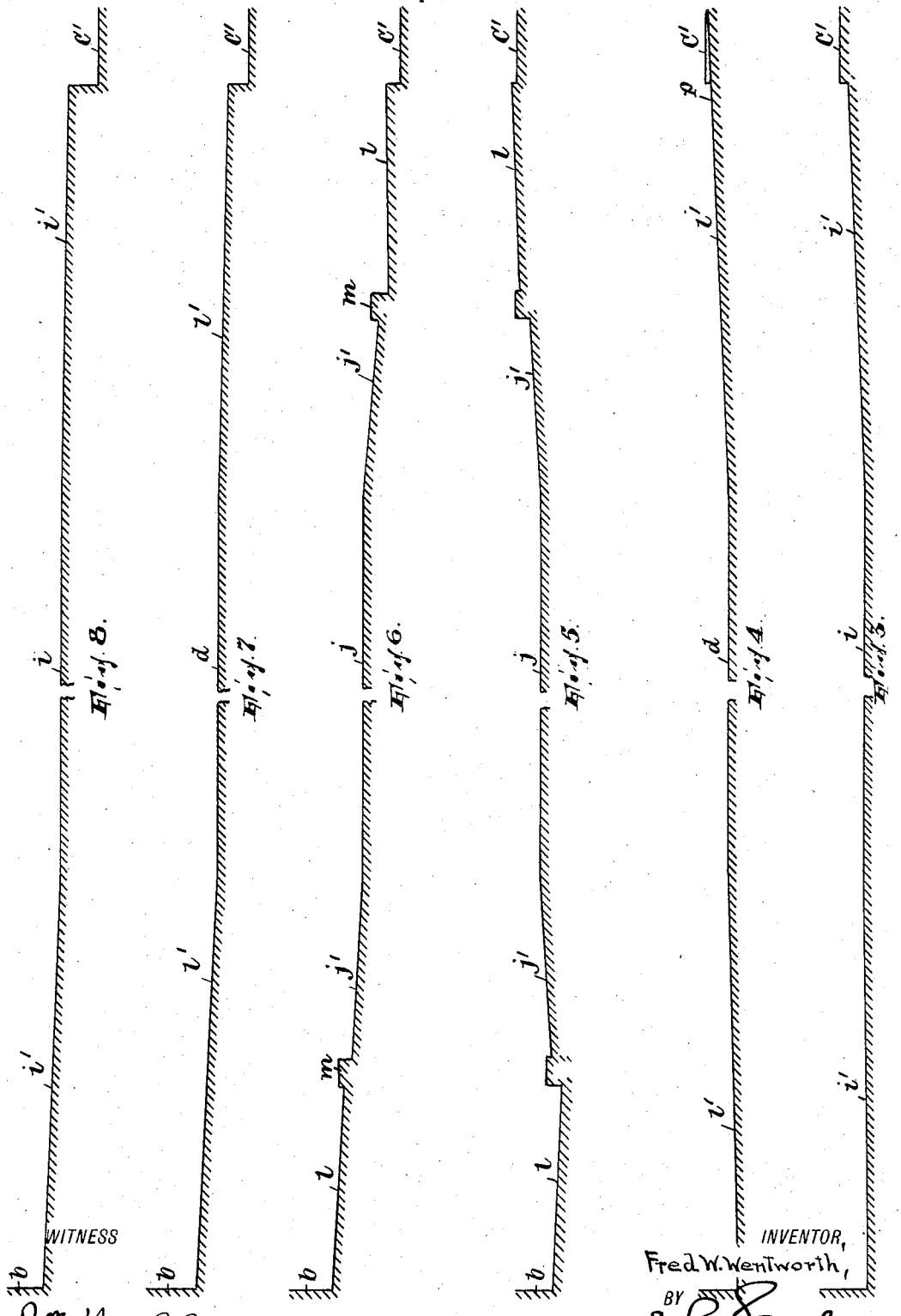

May 11, 1926.

F. W. WENTWORTH

GARAGE

Filed April 21, 1923    4 Sheets-Sheet 4

1,584,705

WITNESS

INVENTOR,
Fred W. Wentworth,
BY
ATTORNEY

Patented May 11, 1926.

1,584,705

UNITED STATES PATENT OFFICE.

FRED W. WENTWORTH, OF PATERSON, NEW JERSEY.

GARAGE.

Application filed April 21, 1923. Serial No. 633,615.

This invention relates to buildings and particularly to buildings in which to store vehicles, as automobiles. It has been proposed to provide a building of this class in which the floors are arranged in laterally offset relation to each other and each floor has a driveway extending parallel with the vertical plane between the laterally offset floors and storage space for vehicles flanking (as at each side of) each driveway, each floor at one elevation being connected with the floor at the next elevation by a ramp. But heretofore the ramp connecting any two floors was straight (or substantially straight) and arranged at an angle to the aforementioned driveway. This made it necessary, especially where in order to produce the maximum storage area the said storage spaces along the walls of the building were extended so as to reach opposite the ramp, to reduce the length of the ramp and this in turn made its pitch undesirably steep. The primary objects in structures of this class are of course on the one hand to conserve the maximum area for storage purposes and on the other to permit as easy progress as possible of vehicles from each floor to the next, but in the structure I have referred to one of these objects must necessarily be sacrificed to the other: if the storage spaces along the walls reach opposite the ramp the latter must be short and hence steep, and if the ramp is extended so as to be less steep the portions of said spaces opposite the ramp become insufficient for vehicle storage. In any event there are these further disadvantages, that the straight ramp requires a vehicle in entering or leaving the ramp to take a skewed position (in plan) with respect to the ramp, reducing the lateral clearance very materially, and also to be canted or thrown out of horizontal at its front portion.

The principal object of this invention is to provide a building of the class stated (i. e., in which the floors are arranged horizontally and in laterally offset relation to each other and at different levels and each has a horizontal driveway extending parallel with the vertical plane between the laterally offset floors and a storage space for vehicle flanking, as at each side of, each driveway) with a ramp connecting each two such floors which shall not encroach upon any part of the storage area and yet will present a long, easy grade and be adapted to have vehicles enter and leave it squarely positioned with respect thereto, instead of skewed, and without encountering any undesirable surface irregularity such as I have indicated. This object I accomplish by making the ramp substantially U-shaped in plan, with its legs flanked by the ends of the storage spaces, which, as aforesaid, flank the driveways, the legs of the ramp thus becoming direct continuations of the horizontal driveways of the two floors.

The ramp, according to the best form of the invention, is warped in such manner that whereas each of its ends or terminals lies in coincidence with the plane of the corresponding floor, it presents a transverse inward and downward slope which gradually increases from the lower terminal to the mid-portion of the ramp and from there on gradually decreases toward the upper terminal. This allows vehicles to traverse the ramp at a greater speed consistent with safety than if all transverse sections thereof present horizontal lines.

Again, in the best form the end of each storage space which flanks each leg of the ramp is preserved as a plane but inclined as said leg inclines from one floor toward the next and substantially in the same degree, so that a vehicle without encountering any undue surface-irregularity may pass from one to the other of the ramp and said incline plane and when on the latter stand transversely thereof.

In the drawings,

Fig. 1 is a sectional plan of a building construction according to this invention and showing two laterally offset floors and two ramps, one connecting the driveways of these floors, this view also showing a supplemental floor in a wing of the building.

Fig. 2 is a similar view, on a larger scale, of the right-hand end portion of what is shown in Fig. 1;

Figs. 3 to 8 are sectional views on lines 3—3 to 8—8, Fig. 1, showing surface-profiles in vertical planes extending parallel with the driveways; and Figs. 9 to 12 are sectional views on lines 9—9 to 12—12, Fig. 1, showing surface-profiles in vertical planes extending at right angles to the driveways.

The building shown includes the two longitudinal or side walls $a\ a$ and the two transverse or end walls $b\ b$ together enclosing a rectangular space. At one end of this structure may be an annex structure indicated as a whole by $c$.

Each side of the vertical longitudinal central plane of the building $a$—$b$ floors $d$ are provided, those at each side being sufficiently spaced to admit between them the vehicles to be stored and those at one side being at levels half-way between those at the other side. It is not material how these floors are constructed and supported, but preferably they are of reinforced concrete construction and they are supported at their outer longer sides by the walls $a\ a$ of the building and also by rows of columns $e, f, g$, the vertical tier of rows of columns $g$ being common to all the floors on both sides of the aforementioned plane, so that between the columns there will be spaces from floor to floor (see Figs. 10 and 11) interrupted only by a guard rail $h$ or equivalent.

Each floor has a horizontal driveway extending parallel with the said vertical plane between the laterally offset floors, the lateral margins of which in the present example are delineated by the rows of columns $e\ f$. Flanking each driveway, in the present example at each side thereof, is a storage space for vehicles; one such storage space is shown at $i$ between the wall $a$ and the row of columns $e$ and the other at $j$ between the rows of columns $f\ g$. Vehicles stored in these spaces are indicated at $k$. Each storage space $i$ extends from one wall $b$ to the other; each storage space $j$ extends the full length of the row of columns $g$ for supporting the inner margins of the floors.

For connecting each floor with a floor laterally offset with respect thereto and at the next level there is a ramp $l$. Each such ramp has in plan a bent or substantially U-shaped form, and each of its extremities or legs $l'$ extends in between the nearer end portions of the storage spaces $i\ j$ of the floor to which such leg leads. The general pitch of the ramp, whose surface at each end thus merges into that of the corresponding driveway and forms a continuation thereof, is preferably of the same degree from its lower to its upper end except in a respect to be indicated in connection with the preferred form. When there are more than two floors the lower end of each ramp (above the lowest ramp) merges into the opposite end of the same driveway into which the upper end of the next lower ramp merges, so that in plan there will be two groups of ramps having their concave sides inward and all presenting either left-hand turns or right-hand turns (in the example, the latter as indicated by the arrows in Fig. 1) to rise from floor to floor. Now it will be seen that by giving the ramps the plan form stated and by causing the legs thereof to be flanked by the ends of the storage spaces I do not reduce in any degree the storage spaces and yet by just so much as the ramp is longer than a straight ramp its pitch is reduced; in fact, the matter of encroaching on storage space is by my invention not at all a factor in restricting the grade of the ramp within any limit. In addition, each vehicle is adapted to approach and leave a ramp in squared relation thereto, so that there is neither skewing nor canting of the vehicle at that time. The end columns in the column rows $f$ are set in relatively to the corresponding columns in the row $g$ so as to insure adequate clearance; but this is not indispensable and whereas it substracts somewhat from the ends of storage spaces $j$ it does not do so in any greater extent than where clearance is similarly provided for in the case of a straight ramp. $m$ designates curbs connecting the end columns in the rows $f$ with those in the row $g$.

Each ramp is warped or banked so that, whereas each end thereof is flush with the surface of the driveway (which will usually be horizonal), the successive transverse surface lines of the ramp will be gradually pitched more and more at a radially outward and upward incline as far as the center transverse line, (coincident, substantially, with the vertical plane between the laterally offset floors) and thereupon gradually pitched less and less at said radially outward and upward incline. This permits vehicles to make the turn of the ramp at a considerably greater speed, even, than is otherwise possible.

The end portions $i'\ j'$ of the storage spaces $i\ j$ which flank the ends of the ramp legs are preserved as planes, but inclined at the same pitch, approximately, and in the same direction as the adjacent sides of the ramps, the whole surface comprising each ramp leg and such adjoining end portion $i'$ ($j'$) being finished off so that there will be presented no angular or other appreciable obstruction to the movement of a vehicle from the ramp to such end portion or vice versa. Vehicles standing in the thus-inclined end portions of the storage spaces stand crosswise thereof as shown, so that there is no tendency for them to run off the same.

If desired a ramp may be utilized as the approach to a floor $c'$ of a structure as $c$ forming an annex to the structure $a$—$b$. The access opening to this building for the floor shown is indicated at $n$, being alined with the end of a driveway into which the lower end of the corresponding ramp merges, so that "in" (or "up") going vehicles may readily enter upon the annex floor $c'$. In the best form of the invention, where each ramp is warped or banked, the warping or banking is developed beyond the dotted arc

*o* in Figs. 1 and 2 marking the outer lateral margin of the path usually taken by vehicles in passing up the ramp from one floor to the next and at least to the vertical plane between building *a—b* and its annex *c*, and preferably into the annex, this extension *p* of the warped surface of the ramp merging into the (horizontal) surface of the floor *c'* of such annex. In buildings used for storing vehicles it is frequently required that a part thereof be designed for shop or store purposes, requiring higher ceilings than the garage or vehicle-storing part would have, and by providing the warp- or banking-extensions *p* the floor *c'* can have its surface merge into that of the extension and yet be higher than the floor *d* from which the ramp upwardly leads.

In the sectional views Figs. 4, 5, 6 and 7 there will actually be curvature in the (warped) ramp portions of the sections because the planes of these sections are not radial; since this curvature is so slight as to be unapparent to the eye when shown on the scale presented, and since it is quite immaterial to the invention, it has not been illustrated.

Usually the ramps will be constructed of such width that a vehicle may proceed up a ramp at the outside while another is proceeding down at the inside; and if the upgoing vehicle takes the outside course its progress will be facilitated because the grade is at much less pitch than at the inside course.

Having thus fully described my invention, what I claim as new and desire to secure by Letters Patent is:—

1. A building having substantially horizontal floors arranged in laterally offset relation to each other and at different levels and each having a substantially horizontal driveway extending substantially parallel with the vertical plane between said floors and also a storage space flanking the driveway, the building also having a bent ramp connecting a floor at one side with a floor at the other side of said plane and having its legs extending substantially lengthwise of and merging into the driveways of said floors and flanked laterally by the ends of their said storage spaces.

2. A building having substantially horizontal floors arranged in laterally offset relation to each other and at different levels and each having a substantially horizontal driveway extending substanially parallel with the vertical plane between said floors and also a storage space flanking the driveway at each side thereof, the building also having a bent ramp connecting a floor at one side with a floor at the other side of said plane and having its legs merging into the driveways of said floors and each extending substantially lengthwise of the driveway into which it merges and between the storage spaces flanking such driveway.

3. A building having substantially horizontal floors arranged in laterally offset relation to each other and at different levels and each having a substantially horizontal driveway extending substantially parallel with the vertical plane between said floors and also a storage space flanking the driveway, the building also having a bent ramp connecting a floor at one side with a floor at the other side of said plane and having its legs extending substantially lengthwise of and merging into the driveways of said floors and flanked laterally by the ends of their said storage spaces, and said ends of the storage spaces being inclined in the same direction as and merging into the ramp legs which they respectively flank.

4. A building having substantially horizontal floors arranged in laterally offset relation to each other and at different levels and each having a substantially horizontal driveway extending substantially parallel with the vertical plane between said floors and also a storage space flanking the driveway, the building also having a bent ramp connecting a floor at one side with a floor at the other side of said plane and having its legs extending substantially lengthwise of and merging into the driveways of said floors and flanked laterally by the ends of their said storage spaces, and said ends of the storage spaces being planes inclined in the same direction as and merging into the ramp legs which they respectively flank.

5. A building having substantially horizontal floors arranged in laterally offset relation to each other and at different levels and each having a substantially horizontal driveway extending substantially parallel with the vertical plane between said floors and also a storage space flanking the driveway, the building also having a bent ramp connecting a floor at one side with a floor at the other side of said plane and having its legs extending substantially lengthwise of and merging into the driveways of said floors and flanked laterally by the ends of their said storage spaces and said ramp having a transverse outward and upward slope increasing from the lower end thereof to a point partway up the ramp and then decreasing from said point to the upper end of the ramp.

6. A building having substantially horizontal floors arranged in laterally offset relation to each other and at different levels and each having a substantially horizontal driveway extending substantially parallel with the vertical plane between said floors and also a storage space flanking the driveway, the building also having a bent ramp connecting a floor at one side with a floor at the other side of said plane and having its legs merging into the driveways of said storage spaces, and said ramp having a transverse outward and upward slope increasing from the lower end thereof to a point partway up the ramp and then decreasing from said point to the upper end of the ramp and the building further including an annex floor at a higher level than the floor from which the ramp leads and located relatively outward of the ramp and the ramp having its said slope extended and merging into said annex floor.

7. A building having substantially horizontal floors arranged in laterally offset relation to each other and at different levels and each having a substantially horizontal driveway extending substantially parallel with the vertical plane between said floors, the bulding also having a bent ramp connecting a floor at one side with a floor at the other side of said plane and having its legs extending substantially lengthwise of and merging into the driveways of said floors, and said ramp having a transverse outward and upward slope increasing from the lower end thereof to a point partway up the ramp and then decreasing from said point to the upper end of the ramp.

In testimony whereof I affix my signature.

FRED W. WENTWORTH.